(12) United States Patent
Huang et al.

(10) Patent No.: US 7,672,832 B2
(45) Date of Patent: Mar. 2, 2010

(54) STANDARDIZED NATURAL LANGUAGE CHUNKING UTILITY

(75) Inventors: Chang-Ning Huang, Beijing (CN); Hong-Qiao Li, Beijing (CN); Jianfeng Gao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 422 days.

(21) Appl. No.: 11/345,615

(22) Filed: Feb. 1, 2006

(65) Prior Publication Data

US 2007/0282592 A1 Dec. 6, 2007

(51) Int. Cl.
G06F 17/27 (2006.01)
(52) U.S. Cl. .......................................... 704/9
(58) Field of Classification Search ...................... 704/9
See application file for complete search history.

(56) References Cited

U.S. PATENT DOCUMENTS 6,108,620 A * 8/2000 Richardson et al. ............ 704/9

OTHER PUBLICATIONS

Bird, et al., "Chunk Parsing", Tutorial for Natural Language Toolkit (NLTK), University of Pennsylvania, Nov. 2005.*
Li et al., "Chinese Chunking with another type of spec", In SIGHAN-2004. Barcelona, Jul. 2004.*
Erik F. Tjong Kim Sang, "Memory-based shallow parsing", Journal of Machine Learning Research, Mar. 2002.*
Dragon Naturally Speaking User's Guide, Scansoft, Version 8, Feb. 2005.*
Ramshaw, "Text chunking using transformation-based learning", ACL Third workshop on very large corpora, 1995.*
Molina et al., "Shallow parsing using specialized HMMs", Journal of Machine Learning Research, 2002.*
Steven P. Abney, "Parsing by Chunks", available in *Principle-Based Parsing: Computation and Psycholinguistics*; Robert C. Berwick, Steven P. Abney, & Carol L. Tenny, editors; Springer, Apr. 30, 1991, ISBN 0792311736; pp. 257-278.
Erik F. Tjong Kim Sang & Sabine Buchholz, "Introduction to the CoNLL-2000 Shared Task: Chunking", in *Proceedings of CoNLL-2000 and LLL-2000*, Lisbon, Portugal, 2000; pp. 127-132.
Su-jian Li, Qun Liu, & Zhi-feng Yang, "Chunk Parsing with Maximum Entropy Principle", available in *Chinese Journal of Computer*, 25(12), 2003; pp. 1734-1738; English abstract.
Shi-wen Yu, Hui-ming Duan, Xue-feng Zhu, & Swen Bing, "The Basic Processing of Contemporary Chinese Corpus at Peking University", available in *Journal of Chinese Information Processing*, 16(6), 2002; pp. 58-65; English abstract.
Nianwen Xue, Fu-Dong Chiou, & Martha Palmer, "Building a Large-Scale Annotated Chinese Corpus", available in *Proceedings of the 19th International Conference on Computational Linguistics*, Taipei, Republic of China; Morgan Kaufmann, ISBN 1558608966; 2002.
Nianwen Xue & Fei Xia, "The Bracketing Guidelines for the Penn Chinese Treebank (3.0)", Technical Report, University of Pennsylvania, Oct. 2000; available at url http://www.cis.upenn.edu/~chinese/.

* cited by examiner

*Primary Examiner*—Richemond Dorvil
*Assistant Examiner*—Jialong He
(74) *Attorney, Agent, or Firm*—Westman, Champlin & Kelly, P.A.

(57) ABSTRACT

A method is disclosed for providing a chunking utility that supports robust natural language processing. A corpus is chunked in accordance with a draft chunking specification. Chunk inconsistencies in the corpus are automatically flagged for resolution, and a chunking utility is provided in which at least some of the flagged inconsistencies are resolved. The chunking utility provides a single, consistent global chunking standard, ensuring compatibility among various applications. The chunking utility is particularly advantageous for non-alphabetic languages, such as Chinese.

20 Claims, 5 Drawing Sheets

STANDARDIZED NATURAL LANGUAGE CHUNKING UTILITY

BACKGROUND

There is a strong need felt in industry and academia for effective natural language processing (NLP). Among the goals of natural language processing is to enable automated systems such as computers to perform functions on an input of natural human language. This would tremendously multiply the capabilities of computing environments in a broad range of applications. However, despite substantial investigation by workers in artificial intelligence and linguistics, effective natural language processing has remained elusive. Additionally, different attempted solutions have been developed and applied from one application to another, causing inconsistencies that prevent NLP interaction between applications.

Furthermore, there are special problems in trying to develop NLP systems for certain languages that use non-alphabetic writing systems. For example, one such language is Chinese, which uses a largely logographic writing system, wherein thousands of characters are used, each functioning as a logogram—that is, representing a concept rather than a particular sound, as in an alphabetic writing system such as that used for English and other Western languages. A single character may represent a word, or two or more characters may together represent a single word. Additionally, the characters are traditionally written in a continuous string, without spacing separating one word from the next, as is typically in alphabetic writing systems. This adds an extra layer of ambiguity relative to languages written alphabetically: the ambiguity in the proper boundaries between words from among a continuous string of logograms, that may be one or several to a word. This ambiguity has posed a formidable additional obstacle to NLP systems in languages using logographic writing systems as opposed to those using alphabetic writing systems. Still other languages are written with a substantially syllabary writing system, in which each character represents a syllable. For example, Japanese is written with a mixture of logographic (kanji) and syllabary (hiragana and katakana) characters. The hiragana characters sometimes give hints on how to separate words and phrases, while the kanji and katakana characters likely would not, therefore also presenting an additional layer of ambiguity not encountered in NLP with Western writing systems.

Therefore, there is a persistent need for better methods and systems of natural language processing, particularly in non-alphabetic languages.

The discussion above is merely provided for general background information and is not intended to be used as an aid in determining the scope of the claimed subject matter.

SUMMARY

A method is disclosed for providing a chunking utility that supports robust natural language processing. A corpus is chunked in accordance with a draft chunking specification. Chunk inconsistencies in the corpus are automatically flagged for resolution, and a chunking utility is provided in which at least some of the flagged inconsistencies are resolved. The chunking utility provides a single, consistent global chunking standard, ensuring compatibility among various applications. The chunking utility is particularly advantageous for non-alphabetic languages, such as Chinese.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

Various embodiments provide a wealth of additional and unexpected advantages, beyond the resolution of difficulties with current solutions. A variety of other variations and embodiments besides those illustrative examples specifically discussed herein are also contemplated, and may be discerned by those skilled in the art from the entirety of the present disclosure.

DETAILED DESCRIPTION

Natural language processing (NLP) tasks can analyze text to identify syntactic and/or semantic information contained therein. Syntax refers generally to the rules by which the symbols or words of a language may be combined, independent of their meaning, while semantics refers generally to the meaning of a grouping of symbols or words.

Such natural language processing tasks may include word segmentation, part-of-speech tagging, text chunking, parsing, and semantic labeling. Chunking a text is an intermediate step towards full parsing of text. Chunking is a useful and relatively tractable median stage of text analysis that is to divide sentences into non-overlapping segments only based on superficial and local information. Chunking has been viewed as an intermediate step of parsing. While parsing typically involves identifying all linguistic structure of sentence, such as the head of a sentence, other components, and relationships among components, chunking is an intermediate step, involving identifying phrase boundaries of sentences. Chunking results in the syntactic structure of a text becoming identifiable, into e.g. noun phrases, verb phrases, and so forth. This also allows the relationships or dependencies between the phrases to become identifiable. For example, one noun phrase is the subject of the verb phrase, and a second noun phrase is the object of the verb phrase.

Chunking depends on a pre-defined set of chunk types, so a text can be divided into separate, non-overlapping chunks, each of which is assigned a consistent chunk type. According to one illustrative embodiment (as elaborated below), eleven chunk types are defined, one of which may appropriately cover most portions of a text (while a few sections of text are left unchunked, such as auxiliaries and conjunctions).

A chunking utility may be developed which may support additional natural language processing applications along with a variety of other kinds of applications. The chunking utility, in one illustrative embodiment, may include the definitions of the chunk types, a set of unambiguous chunking rules (such as to omit auxiliary words and conjunctions from the chunks), and a large, well-refined chunking specification that has been refined through iterative chunking consistency feedback with a training corpus.

By providing a rich characterization of the phrase types and boundaries in a text, chunking is also considerably useful in itself, in applications in addition to those that involve further natural language processing, such as voice user interface, machine translation, and search, as a few illustrative examples. Chunking a text includes dividing the text into syntactically correlated groups of words, which may be used by additional applications. This is illustrated in later sections with examples demonstrating certain embodiments that are illustrative of a broader range of methods.

Figure 1:
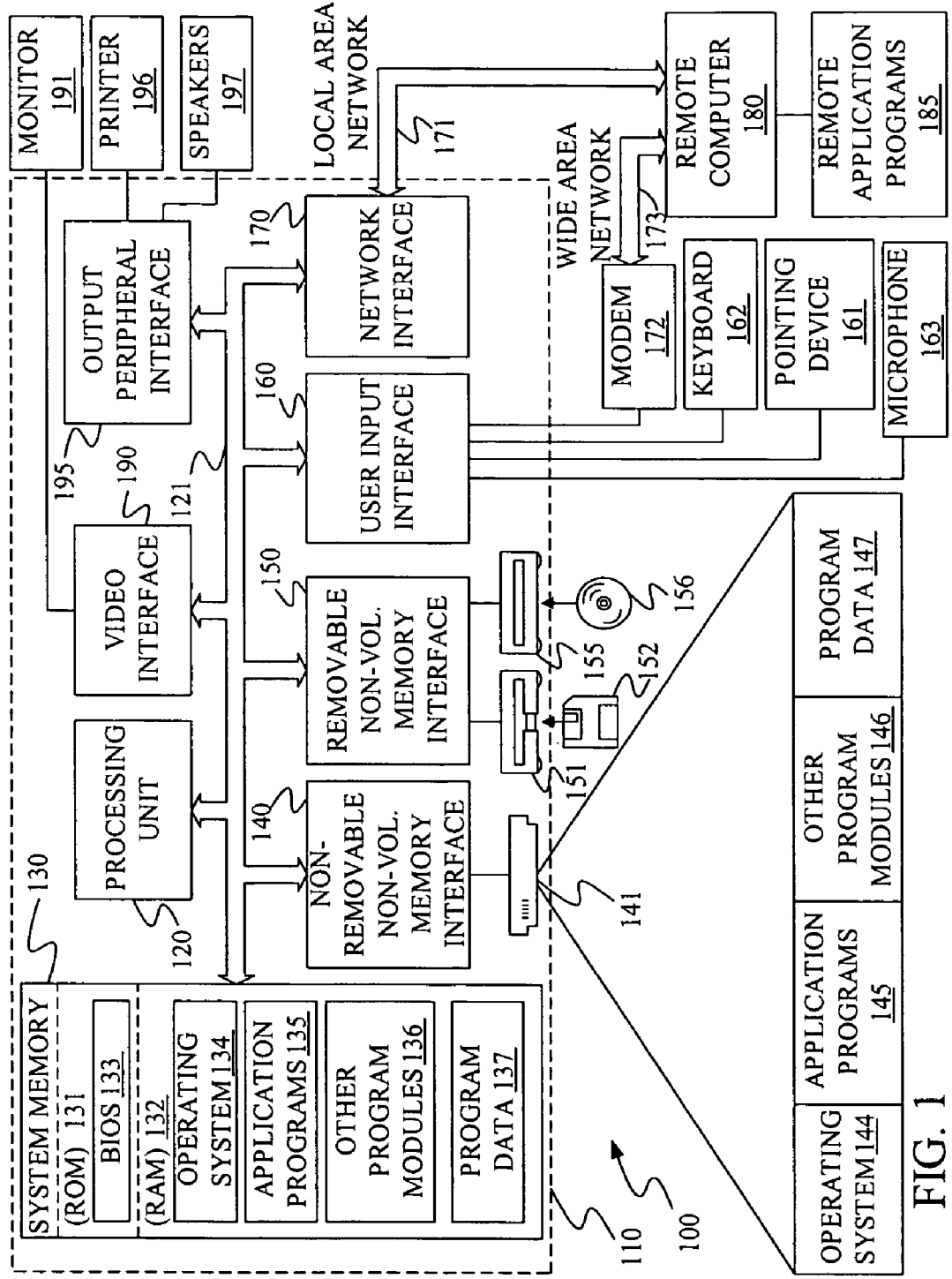
FIG. 1 depicts a block diagram of a general computing environment, according to an illustrative embodiment.

Prior to discussing particular aspects of present embodiments in greater detail, a few illustrative systems and environments with which various embodiments can be used are discussed. FIG. 1 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Various embodiments may be implemented as instructions that are executable by a computing device, which can be embodied on any form of computer readable media discussed below. Various additional embodiments may be implemented as data structures or databases that may be accessed by various computing devices, and that may influence the function of such computing devices. Some embodiments are designed to be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may be operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
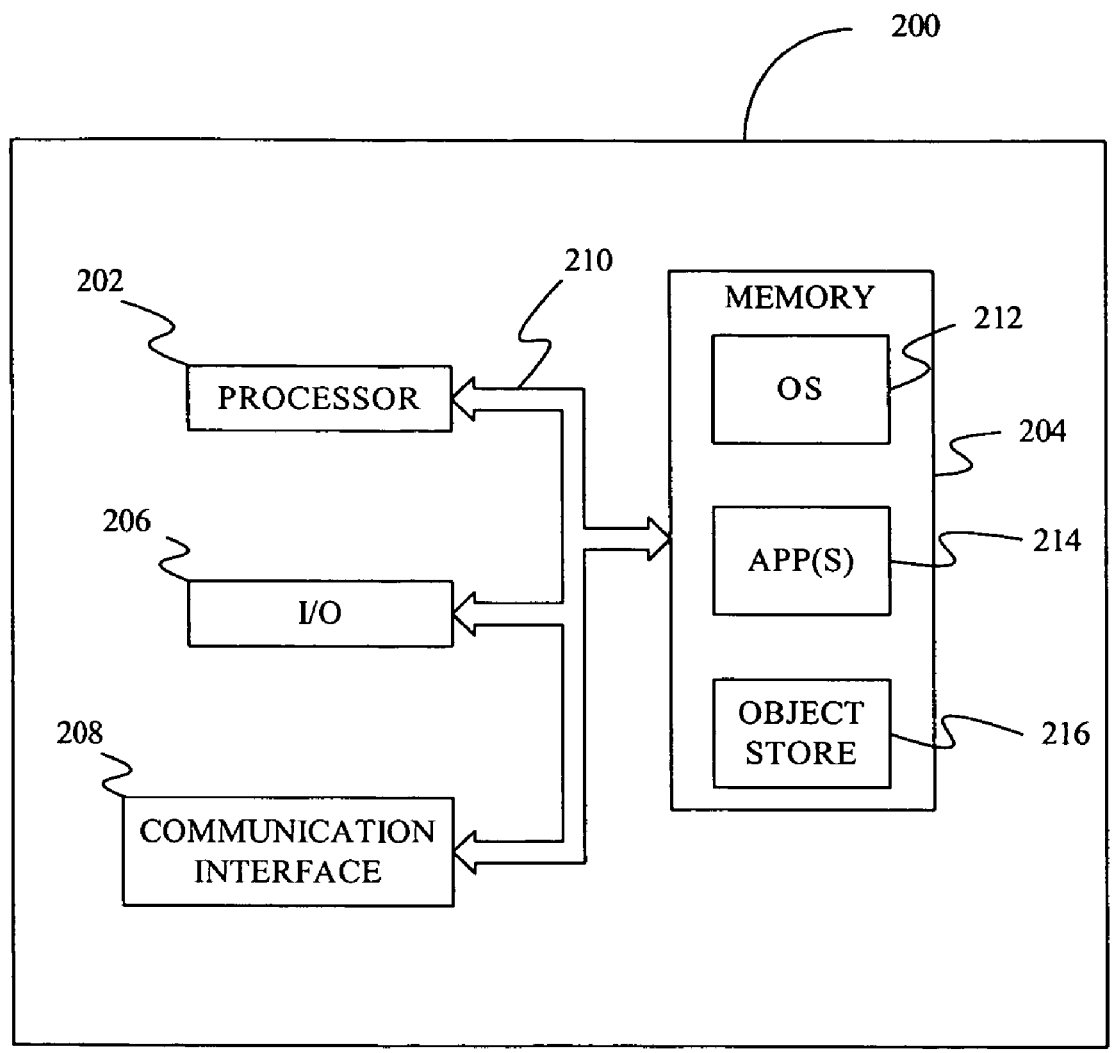
FIG. 2 depicts a block diagram of a general mobile computing environment, according to another illustrative embodiment.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is illustratively allocated as addressable memory for program execution, while another portion of memory 204 is illustratively used for storage, such as to simulate storage on a disk drive.

Memory 204 includes an operating system 212, application programs 214 as well as an object store 216. During operation, operating system 212 is illustratively executed by processor 202 from memory 204. Operating system 212, in one illustrative embodiment, is a WINDOWS® CE brand operating system commercially available from Microsoft Corporation. Operating system 212 is illustratively designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Figure 3:
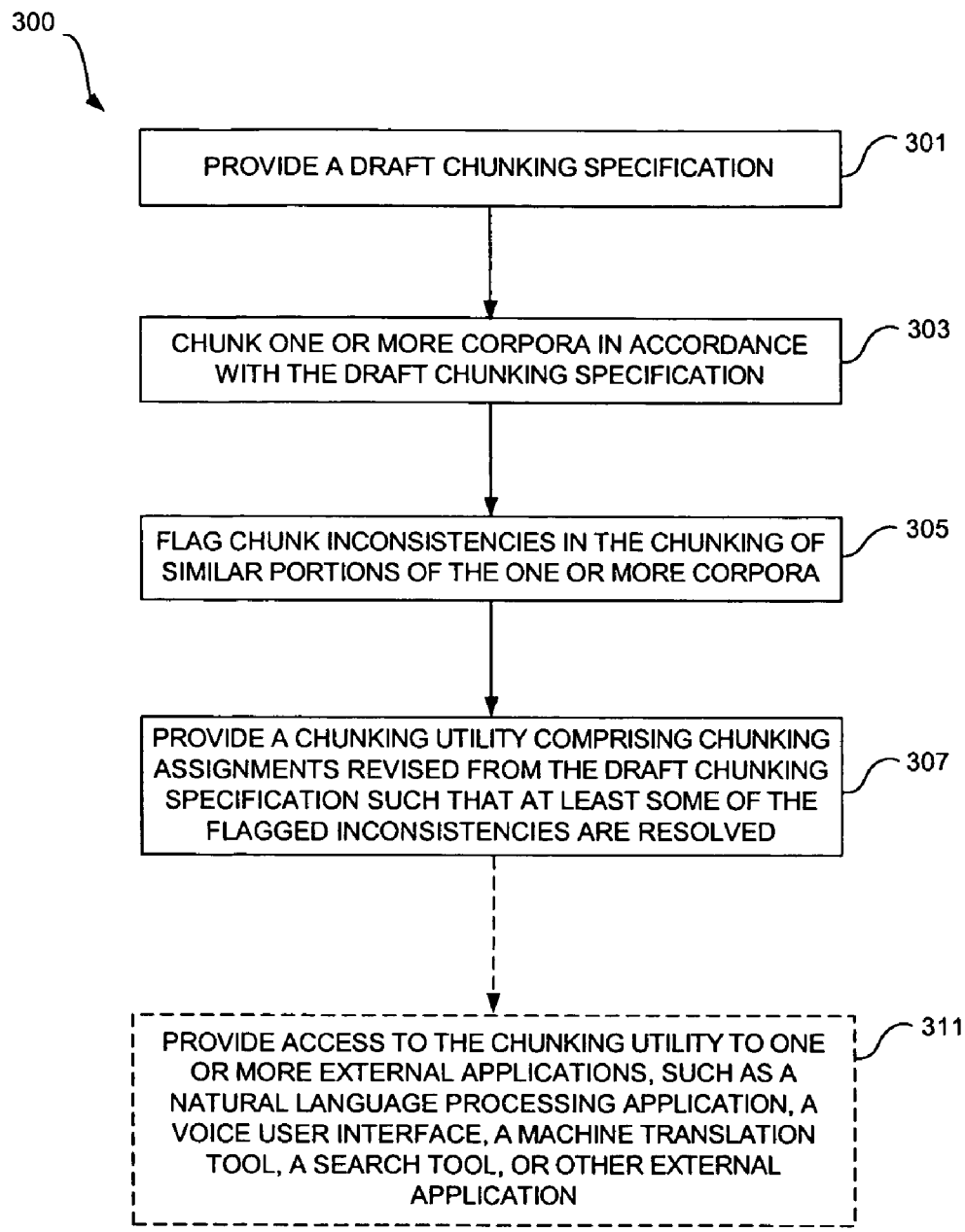
FIG. 3 depicts a flowchart for a method of language chunking, according to an illustrative embodiment.

FIG. 3 depicts a flowchart for a method 300 of language chunking, according to an illustrative embodiment. This illustrative embodiment is provided in further detail as follows, with the understanding that this particular embodiment is an illustrative example only, and does not imply any limitations on the several additional embodiments that are encompassed. Method 300 is implementable at least in part by a computing device, such as computer 110 of FIG. 1 or mobile device 200 of FIG. 2, for example. Method 300 is advantageously configured to provide an optimized, highly consistent chunking utility, or chunking specification, that may serve as a global standard among an array of other applications, devices, and platforms, in one example. An application may perform at least part of method 300, and may continue using and applying the optimized chunking utility to perform chunking on new inputs, as elaborated below with reference to FIG. 4. Method 300 serves to reduce or eliminate current obstacles related to independent and inconsistent approaches to language processing among various applications and environments, in the language or languages in which chunking utilities or chunking specifications associated with method 300 are provided.

As an overview, method 300 includes step 301, of providing a draft chunking specification; step 303, of chunking one or more corpora in accordance with the draft chunking specification; step 305, of flagging chunk inconsistencies in the chunking of similar portions of the one or more corpora; and step 307, of providing a chunking utility comprising chunking assignments revised from the draft chunking specification such that the flagged inconsistencies are resolved. Method 300 may also include additional steps, such as step 311, of providing access to the chunking utility to one or more external applications, such as a natural language processing application associated with additional natural language processing tasks, or additional applications such as a voice user interface, a machine translation tool, or a search tool, among other potential applications.

Method 300 includes step 301, of providing a draft chunking specification. This may be, for example, a first iteration drafted based on computational linguistic principles. The draft chunking specification provides indications of how a text may have chunk annotations or indications associated with the elements of the text. This is elaborated in greater detail below.

Method 300 further includes step 303, of chunking one or more corpora in accordance with the draft chunking specification. For example, two similarly sized and similarly sourced training corpora (e.g., all articles from each of two separate major newspapers over the same long duration of time) may be used for chunk training at the same time based on the same draft chunking specification. The scale of each training corpus may be, for example, in excess of one million words, in one illustrative embodiment, or in excess of half a million sentences, in another embodiment. The corpora may be smaller or larger than this range in various embodiments. The chunk-assigned results from both corpora may then be compared for inconsistencies, in which similar or identical portions of text were chunked differently. The corpus or corpora used for this step may, for example, include large collections of fairly standard published examples of written text in the target language, such as a collection of all articles appearing in a major newspaper over long periods of time. For example, one prominent English corpus relies on a large collection of published material from the Wall Street Journal. A corpus in another language such as Chinese might similarly include a large collection of articles from a major Chinese-language newspaper such as the People's Daily, for example.

As the corpus is chunked in accordance with the draft chunking specification, a large amount of chunked text is accumulated and made available for mutual comparison. This in turn provides a valuable way of evaluating the performance of the chunking specification as it is used by the chunking application performing the chunking. The application performing method 300 continues storing chunked corpus in accordance with the chunking indications provided by the chunking specification, and as the sample of chunked corpus grows larger, chunking inconsistencies may be discovered. These chunking inconsistencies consist of identical or similar sections of text from different parts of the corpus, that have been chunked differently from each other. This indicates an inconsistent set of indications from the chunking specification. Such inconsistent indications are difficult to eradicate, because they often tend to stem from ambiguities in language that human speakers take for granted, and typically interpret from context without a second thought, but that resist bright-line logical delineations of the kind that might more easily be comprehended by a software application.

As one illustrative example in English of such easily overlooked linguistic ambiguity, the terms "con" and "pen" can both have a variety of meanings on their own or as parts or prefixes of larger words. However, when someone says, "the con is in the pen", a human listener fluent in English does not think twice about understanding this statement to mean that "the convict is in the penitentiary". However, such real-world context as we take for granted in combining with the statement of itself to deduce the meaning, is not available to a computer application, and cannot be compensated for without a considerable complexity of different indications for how to chunk or otherwise interpret the terms "con" and "pen" using only the knowledge of their surrounding text. So, even after significant development, it might not be surprising to find a chunking utility having provided inconsistent chunking indications between two different occurrences of the phrase "the con-" in different textual contexts, perhaps between "the con is in the pen", "the convent had to be evacuated", and "the conniving became too much for her". Similarly, in Chinese, for example, a single sentence may read (as transliterated into Roman alphabetic characters in the standard pinyin), to take an egregious example, "mā mǎ mà ma mà mǎ mā ma", which means, "Did mother curse the horse or did the horse curse mother?"

While the Chinese characters in the former sentence provide more substantial differences to distinguish the meaning of the words, Chinese is also noted for frequently having an identical character that may mean very different things in different contexts, a more serious obstacle for chunking Chinese text. Referring again to "mǎ", or "马", this is the word for horse, when it is alone. The character also appears as one of two or more characters in literally dozens of other words. Many have to do more or less with a horse, such as words for bridle, horsepower, cart, and engine. However, they also include 马表=mǎbiǎo, which means "stopwatch", though 马表as two separate words mean "horse surface"; 马夫=mǎfū, which means "groom", while 马夫as separate words mean "horse husband"; 马虎=mǎhu, which means "careless", while 马虎as separate words mean "horse tiger"; 马上=mǎshàng, which means "immediately", while 马上as separate words mean "horse up"; 马戏=mǎxl, which means "circus", while 马戏as separate words mean "horse play"; 马路口="mǎlùkǒ", which means "intersection", while as separate words 马路口means "horse road mouth"; 马铃薯="mǎlíingshǔ", which means "potato", though 马铃薯as separate words mean "horse bell yam".

To add still additional complexity and sensitivity to context, a single character may mean completely different things, each of which is pronounced differently. For example, the character 和may be pronounced huó, huò, hé, or hè. The word "huó" means soft or warm; the word "huò" means to mix together, to blend; the word "hé" may mean and, with, together with, peace, harmony, or union; and "hè" means to respond within a poem or to respond in singing. Despite the different pronunciations in spoken Chinese, each of these words is written as 和, with only context to inform the reader which meaning is intended. This is in addition to the possibilities for 和to be part of a multi-character word, such as 和风=héfeng=breeze; 和解=héhǎo=to become reconciled; 和尚=heshang=Buddhist monk; or 和平主义=hépingzhǔyi=pacifism, among a wide variety of other examples.

There are several other examples, but this provides some indication of the ambiguous sensitivity to context in Chinese, exacerbated (relative to alphabetic languages) by the lack of spaces between words to give any clear indicator of the boundaries separating one word from the next. Furthermore, Chinese involves additional characteristics that complicate chunking, such as relatively little use of function words or inflections. All of these factors make it difficult to automatically assign portions of a text to their appropriate chunks.

As is apparent, even after a substantial amount of development, a chunking utility is likely to continue to experience at least a few inconsistencies in the different chunking indications it provides to an application chunking a corpus. This leads to the next step depicted in method 300, the step 305 of flagging chunk inconsistencies in the chunking of similar or identical portions of the one or more corpora. The application performing the method 300 is, in the present illustrative embodiment, configured to search out and automatically flag such inconsistencies that accumulate in different sections of the chunked corpus. This may include, for example, an automated comparison of the chunking applied to similar or identical sets of characters from the one or more corpora. Flagging the chunk inconsistencies may also include automatically providing, to an output device such as monitor 191 of FIG. 1 or input/output components 206 of FIG. 2, indications of similar sets of characters that have been chunked differently.

After they are flagged, these inconsistencies can be examined and a selection is made as to which chunking indication is more appropriate. Since identical portions of text may have legitimately different meanings in different contexts, assigning chunk indications should be done in a way that prevents or minimizes interference with the precision of the automatic chunking. It sometimes happens that a sentence appears, for example, in the form ABC, and both AB and BC can be legitimate chunked phrases, but one or the other must be selected to ensure a globally consistent chunking specification, in which case the more useful chunked phrase should be selected with care. The application then responds to this selection of chunking indications by revising the chunking utility with the additional information, thereby adding to the sophistication and complexity it is able to apply to further chunked texts. This leads into step 307, of providing a refined chunking utility comprising chunking assignments revised from the draft chunking specification such that the flagged inconsistencies are resolved. At some point, perhaps after a threshold of consistency is reached, as in one illustrative embodiment, the iterative learning process for refining the chunking specification may be declared finished, and the refined chunking utility, comprising the results of refining the chunking specification, may be made available. In one embodiment, a chunk training application regularly, or in response to a command, calculates the consistency ratio of the chunking utility. For example, this may be the ratio of consistently chunked text to the total amount of text chunked. This automatically calculated consistency ratio can be compared with a threshold level to determine if the chunking utility has become sufficiently refined for its purposes.

One advantageous purpose to which such a highly refined chunking utility can be applied is as a global standard for chunking later inputs in the subject language, across a wide array of different applications, platforms, or environments. The inconsistency of different, localized approaches to natural language processing have posed a significant barrier in the past to different applications interacting in ways that involve the exchange of natural language inputs. Such inconsistencies from one application to another often tend to result in unpredictable or nonsensical results. Instead, as in step 311 according to one embodiment of method 300, access to the refined chunking utility may be provided to external applications, examples of which include a voice user interface, a machine translation tool, and a search tool. These additional applications may be hosted locally on components shared on a computing device executing the chunking method 300, or they may be hosted remotely and communicated with via a network or communication interface, such as wide area network 173 or local area network 171 of FIG. 1, or via communication interface 208 of FIG. 2. With a wide variety of applications able to share in the single, highly refined, global standardized chunking utility provided according to method 300—as opposed, for example, to two or more applications that have incorporated results from different, inconsistent chunking specifications—the interactions among various natural language processing applications and a wide variety of additional applications may become smooth and seamless, with the assurance of as high a level of consistency as is desired. Some of these other applications may go on to perform functions incorporating results from the standardized chunking utility, resulting in tangibly superior performance, such as more valuable search results or more accurate responses in a voice user interface, for example.

Figure 4:
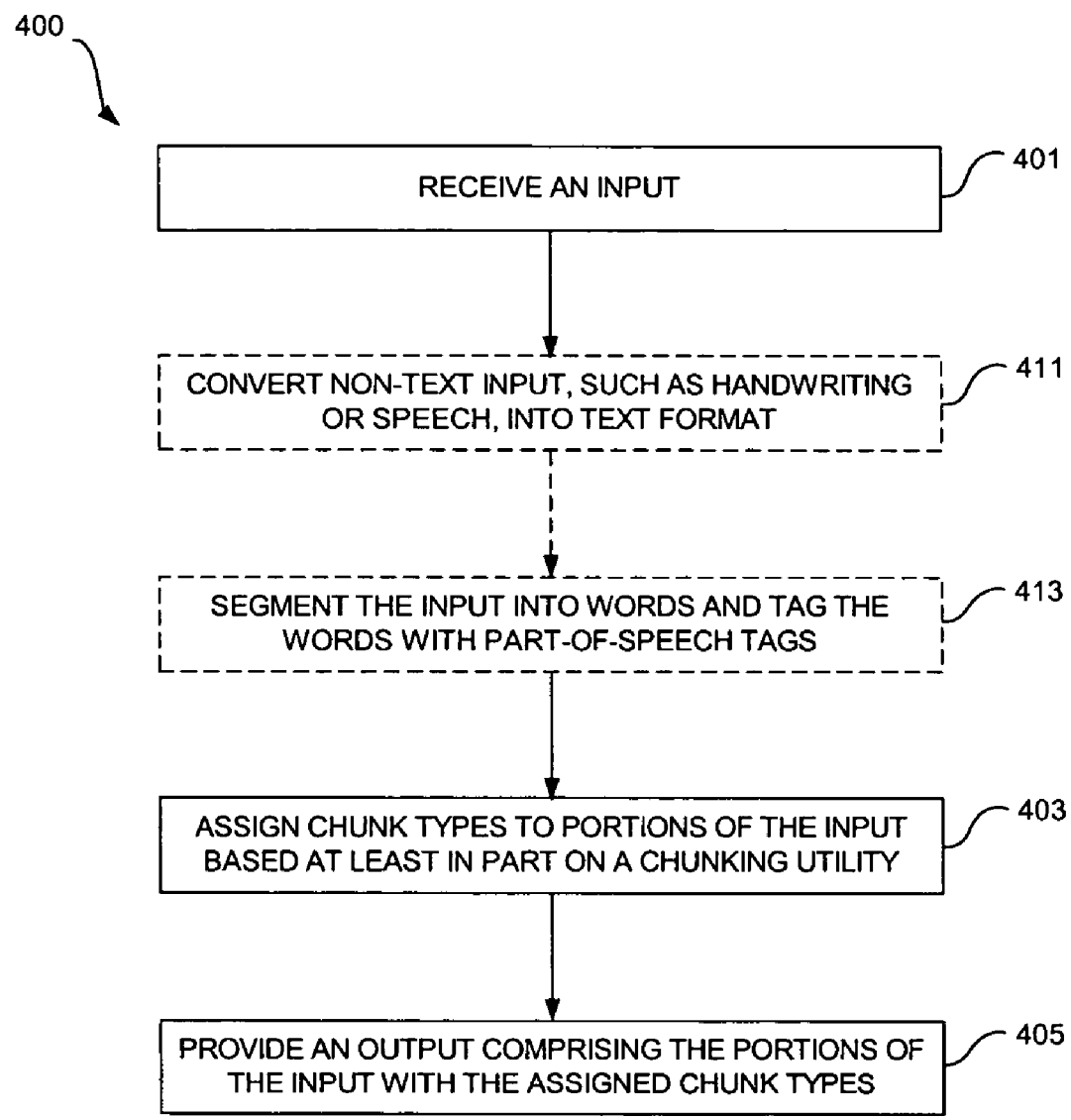
FIG. 4 depicts a flowchart for a method of language chunking, according to another illustrative embodiment.

One example is further illustrated in FIG. 4. FIG. 4 depicts a flowchart for a method 400 of language chunking, according to another illustrative embodiment. Method 400 may be executed by a natural language processing program using the global, standardized, refined chunking utility as its reference. Method 400 includes step 401, receiving an input; step 403, assigning chunk types to portions of the input based at least in part on the chunking utility; and step 405, providing an output comprising the portions of the input with the assigned chunk types. The output may be provided to a user via a user output device, or it may be provided to another application for that application to act on. Method 400 may include a variety of other steps in different embodiments. Method 400 may illustratively include step 411, to convert a non-text input, such as from a user's spoken word or handwriting, into a text format; and step 413, to segment the input into words and tag the words with parts of speech. The chunking may involve searching the refined chunking utility for chunked text portions similar to the portions of the input, and assigning the portions of the input chunk types corresponding to chunk types associated with the chunked text portions. For example, method 400 might include a voice user interface running on a computing device that receives a speech signal from a user, converts the speech signal to text, chunks the text by comparing it to the refined, global, standardized chunking utility, then using the syntactic structure indicated by the chunked text version of the user's spoken word input to carry out tasks indicated by the input and to respond to the user. In other applications, the non-text input may be a user's handwriting, as written with a stylus on the monitor of a handheld or notebook device or otherwise input to a computing device. This input is non-text in the sense that it is not input via a keyboard. In other applications, the user may be entering natural language text inputs; in some applications, chunked texts derived from the user input may be applied to other applications, such as a machine translation tool or a search tool, for example.

Some other additional details involved in various illustrative embodiments are provided in further details below, such as flagging chunk inconsistencies by comparing both chunking indications and tagged part-of-speech sequences of similar passages of text. Also elaborated below are some of the particular advantages provided by a chunking utility directed to chunking in a non-alphabetic writing system such as Chinese or Japanese, for example. In such a case, providing the draft chunking specification may include providing indications for word-segmenting the non-alphabetic writing system, to avoid the word boundary ambiguities particular to such non-alphabetic languages, as indicated with the "horse" example, above.

Figure 5:
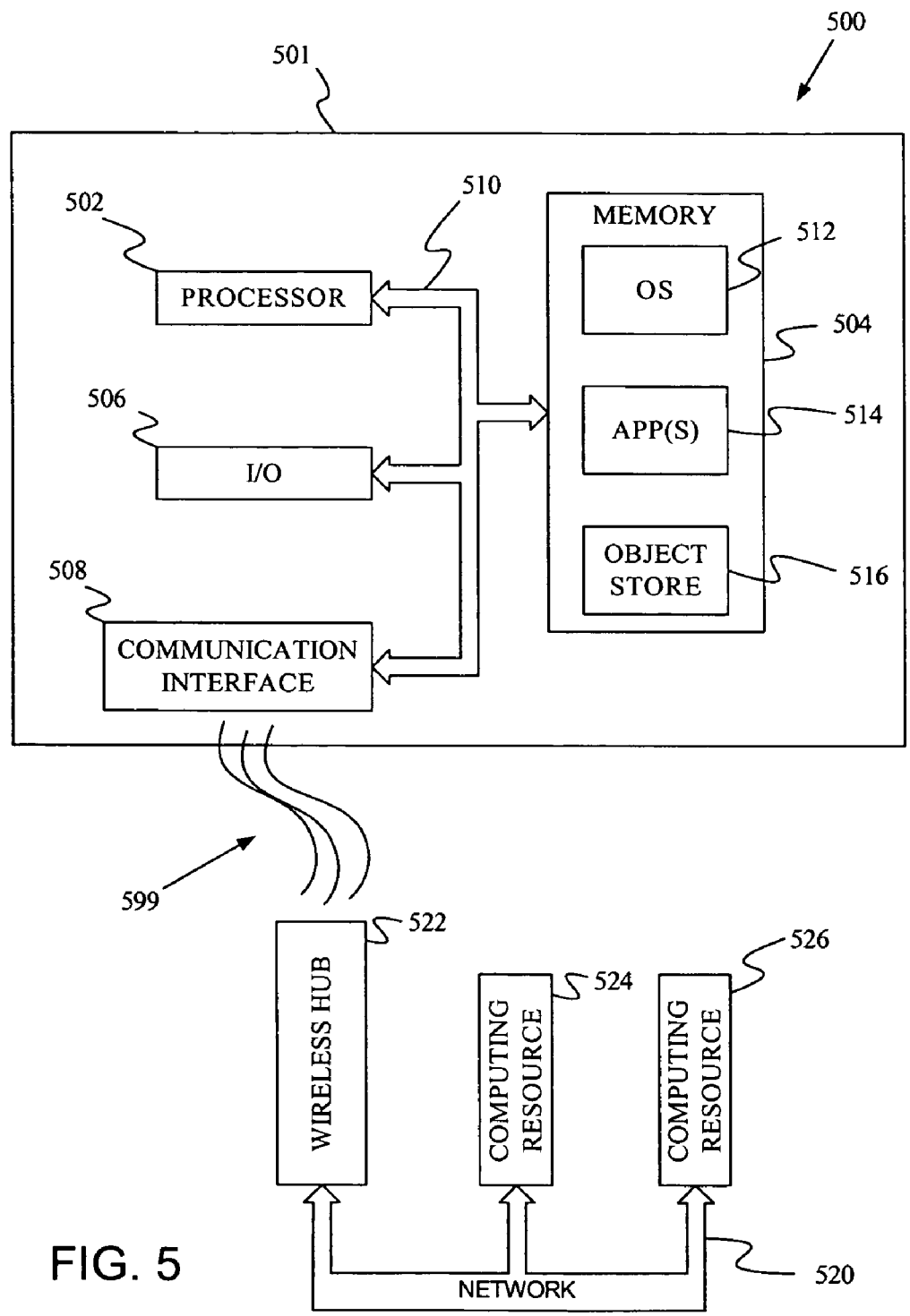
FIG. 5 depicts a block diagram of a general mobile computing environment, comprising a medium with a chunking specification data structure stored on it, according to another illustrative embodiment.

FIG. 5 provides further illustrative examples with a depicted block diagram of a general mobile computing environment 500 according to another illustrative embodiment. Computing environment 500 includes network 520 and computing device 501 having a medium, memory component 504 in this embodiment, that may have a chunking specification data structure stored on it. Computing device 501, similar to mobile device 200 of FIG. 2, besides memory component 504, has a microprocessor 502, input/output (I/O) components 506, and communication interface 508. In this embodiment, the afore-mentioned components are coupled for communication with one another over bus 510. Memory component 504 may be implemented in a wide variety of media, and includes operating system 512, application programs 514, and object store 516. Computing device 501 is illustratively in wireless communication with network 520, such as the Internet, by sending and receiving electromagnetic signals 599 of a suitable protocol between communication interface 508 and wireless hub 522. Wireless hub 522 in turn provides access via network 522 to a wide array of additional computing resources, illustratively represented by computing resources 524 and 526. Computing device 501 is enabled to make use of a data structure stored on the media of memory component 504, the data structure incorporating the global standard chunking specification as discussed above. In this illustrative embodiment, computing device 501 has a natural language processing application among applications 514 stored on memory component 504, the natural language processing application enabled to perform chunking according to methods such as methods 300 and 400 discussed above, and making reference to the global standard chunking data structure. The chunking application hosted on computing device 501 may make the chunking data structure accessible to external applications, including both external applications also hosted on computing device 501 among applications 514, as well as externally hosted applications accessible via communication interface 508 and network 520. As elaborated above with reference to FIGS. 3 and 4, the data structure chunking specification stored on computing device 501 has been refined through iterative chunking consistency feedback with a training corpus.

Additional details on the chunking methods, and using a training corpus to provide iterative feedback in growing the sophistication and optimizing the consistency ratio of the chunking utility specification, are provided below.

As noted above, one factor that makes an important difference in chunking is the type of writing system of the text being chunked. Some languages, such as English and French, are associated with an alphabetic writing system, in which each character represents one sound; while still other languages are associated with a syllabary writing system, in which each character represents one syllable; while still other languages, such as Chinese, are associated with a logographic writing system, in which each character represents a concept or word; while still other languages, such as Japanese, are associated with a mixture of these writing systems. Writing systems are distinguishable from languages, in that a language can typically be represented in a writing system alien to the one with which that language is customarily associated. However, some languages have a prominent history of being written in more than one writing system; for example, the Chinese language is traditionally written in Chinese logographic characters, but can also be written in alphabetic characters. Several standards for transliterating Chinese into alphabetic writing have been developed; perhaps the most widely used is the standard known as pinyin. Other languages have a strong tradition of being written in one writing system, while a closely related language is written in a dramatically different writing system. For example, Urdu is traditionally written in a variation of the Persian alphabet, while Hindi, a language very closely related to Urdu, is traditionally written in the Devanagari script, which is an alphasyllabary writing system, a hybrid of an alphabet and a syllabary.

Whereas alphabetic writing systems typically clearly indicate the separation between adjacent words, the same is often not true of syllabary and logographic writing systems, in which characters are typically written in one long string, with boundaries between words discernible only by context. Even in some largely alphabetic writing systems, such as the alphasyllabic Thai alphabet, the letters are typically written in one continuous stream, with spacing only between sentences, and only context to guide the reader as to the proper boundaries between words within the sentence. Such lack of clear word boundaries poses an added layer of ambiguity for natural language processing systems, and related systems, such as those involving chunking. This is of particular concern because such non-alphabetic languages include some, such as Chinese, for which demand and growth prospects for natural language processing applications are particularly high.

One embodiment directed to aspects of chunking in non-alphabetic languages is illustrated below, as applied to written Chinese texts which are used as an example. It is not necessary for the reader to understand Chinese to follow the steps and methods demonstrated, to illustrate aspects of chunking and associated natural language processing methods, in accordance with certain illustrative embodiments. And although Chinese is used extensively for illustrative examples herein, this does not imply any limitations regarding other languages and writing systems; additional embodiments use similar methods with regard to other languages and writing systems. And, while some additional examples demonstrate particular advantages as applied to non-alphabetic writing systems, this covers a wide range of writing systems; even the so-called Thai alphabet, though closer to being alphabetical than the Chinese writing system, is still actually an alphasyllabary rather than a true alphabet, and therefore non-alphabetic. Additionally, various embodiments are similarly advantageous as applied to true alphabetic writing systems.

Various embodiments of a chunking utility may be directed to any of these languages and writing systems, and provide particular advantages in providing a standardized set of rules across writing systems that are logographic, syllabic, alphabetic, and anything in between, so that the chunking annotations will be represented in a standardized way regardless of the type of underlying writing system or language. Standardized chunking utilities according to various embodiments provide substantial advantages in machine translation, as one illustrative example of the applications facilitated by such chunking utilities.

Examples of Chinese texts are therefore used below to demonstrate how Chinese texts may be, for example, parsed, chunked, and otherwise manipulated. In a few illustrative examples, these characters are provided with Roman alphabet transliterations and English translations, to aid in gaining familiarity with various methods related to chunking. In particular, these examples are provided with three representations of each character: first, the original Chinese characters themselves, in the standardized simplified form (known as ji ǎntizi, i.e. 汉字adopted by the governments of the People's Republic of China and Singapore, as well as by the Library of Congress and the American Library Association; second, in the standardized format for representing transliterated Chinese words with Roman alphabet characters, known as hanyu pinyin, or simply pinyin (hànyǔ pīnyīn, i.e. 汉语拼音; and third, in English translation. So, for example, a character may be provided as: (年=nián=year)—which provides, first the Chinese jiǎntǐzì character (年), then the pinyin representation (nián), and finally the English translation (year). Incidentally, Chinese also commonly uses the same Arabic numerals that are used in English and other Western writing systems.

A first sample sentence in Chinese (preceded by a reference marker, <1>, for the sentence) is used below to demonstrate, first, word-segmenting and part-of-speech tagging, and then chunking. The sample Chinese sentence reads:

<1> １９９７年成了生产停止滑坡并出现增长的一年。

This sentence is a sample chosen from the Jan. 1, 1998 issue of People's Daily, a major Chinese newspaper printed in the simplified jiǎntǐzì script. It is a statement attributed to Boris Yeltsin, referring to the Russian economy. It reads, roughly, "In 1997 production succeeded in halting the collapse and appears to be expanding for the year."

Chunking operates on a passage of text that has already been word-segmented and part-of-speech tagged, in this embodiment. The sentence above is shown here, after being word-segmented:

<1> １９９７年 成 了 生产 停止 滑坡 并 出现 增长 的 一 年 。

It can be seen that the word segmenting has isolated some of the individual logograms by themselves—these ones carry the meaning of a single word by themselves; while other logograms are segmented into pairs, indicating that the two concepts represented by the two separate logograms actually form part of a single word. The distinctions between such single-logogram words and such double-logogram words is not apparent from the original, unspaced string of characters, and indicates the added ambiguity in Chinese, relative to English or other Western languages (in which identifying the words of a text is relatively simpler), involved in natural language processing tasks such as chunking.

Notice, for example, that "１９９７年" is lumped together as a "word"; in Chinese, the symbol 年, pronounced "nián", which means "year", is lumped together with (and after) the numerals, to indicate that it is not just a reference to the numner 1,987, but rather that it means "the year 1997", which represents a single concept and is treated as a single word. Notice also that the period, "。", is also segmented; it also conveys its own meaning separately from any of the other words, i.e. the meaning "(end of sentence)", and it too is treated, and segmented, as its own separate word.

The importance of the word-segmenting can be appreciating by examining the differences between the two-character words in the sentence above, and the words that would be represented by the same characters as one-character words. The two-character words are provided with pinyin transliteration and English translation also provided for each character, in the format (Chinese character=pinyin transliteration=English translation), such as in (年=nián=year). This is in order to aid in gaining familiarity, or as might be done to help English-language developers become familiar with Chinese texts being processed, although it is not a necessary part of a natural language processing or chunking process.

The first two-character word is 生产=shēngchǎn=to produce, to manufacture. If interpreted as two separate words, these characters would mean 生=sheng=to be born, to give birth, and 产=chǎn=to reproduce. The next two-character word is 停止=tíngzhǐ=to stop, to halt, to cease; if interpreted as two separate words, this would mean 停=tíng=to stop, to halt, and 止=zhǐ=to stop; toe. The next two-character word is 滑坡=huapo=rockslide, landslip, collapse; if interpreted as two separate words, this would mean 滑=hua=comical, cunning, slippery, smooth, and 坡=pō=slope. The next two-character word is 出现=chūxiàn=to appear, to arise, to emerge; if interpreted as two separate words, this would mean 出=chu=to go out, to come out, to occur, to produce, and 现=xián=appear, present, now, existing, current. The final two-character word in the above sample sentence is 增长=zēngzhǎng=to grow, to increase expand; if interpreted as two separate words, this would mean 增=zēng=to increase, to expand, to add, and 长=zhǎng=length, long, forever, always, constantly. In each of these cases, there is no blank space between the characters of the word, or between them and the adjacent words; and in isolation, interpreting the pairs as a single two-character word or as two separate one-character words are equally valid; only context is normally available to inform the reader of the true meaning. The word-segmenting effectively substitutes for appreciation of context for an automated chunking utility.

The same sentence is next shown after it has also been part-of-speech tagged:

<1> １９９７ 年/t 成/v 了/u 生产/v 停止/v 滑坡/v 并/c 出现/v 增长/v 的/u 一/m 年/q 。/w

Here, each of the segmented words has been tagged, i.e. has had a tag added to it of the format "/x", with a one or two letter code (in this illustrative embodiment) indicating one of forty pre-defined parts of speech. The part-of-speech tags shown in this example are /t, /v, /u, /c, /m, and /w, with the /v appearing six times and the /u appearing twice. The /t indicates a temporal word; /v indicates a verb; /u indicates an auxiliary; /c indicates a conjunction; /m indicates a numeral; and /w indicates a punctuation mark.

A full list of the forty part-of-speech tags, used in one illustrative embodiment, is provided as follows (with the Chinese name for the parts of speech also listed):
n noun (=名词=míngcí)
nr person name (=人名=rénmíng)
ns location name (=地名=dìmíng)
nt organization name (=机构名=jīgòumíng)
nz other proper name (=其他专名=qítazhuanmíng)
s spatial word (=处所词=chùsǔoci)
t temporal word (=时间词=shíjiāncí)
f localizer (=方位词=fāngwèicí)
v verb (=动词=dòngcí)
vd adverb-verb (a verb that could be used as an adverb directly) (=副动词=fùdóngcí)
vn noun-verb (=名动词=mingdòngcí)
a adjective (=形容词=xíngróngcí)
an noun-adjective (=名形词=míngxíngcí)
ad adverb-adjective (an adjective that could be used as adverb directly) (=副形词=fùxíngcí)
d adverb (=副词=fùcí)
z state word (=状态词=zhùangtàicí)
b non-predicate adjective (=区别词=ōubíecí)
r pronoun (=代词=dàicí)
m numeral (=数词=shǔcí)
q measure word (also called a classifier) (=量词=liàngcí)
c conjunction (=连词=liàncí)
p preposition (=介词=jiècí)
u auxiliary (=助词=zhùicí)
e exclamation (=叹词=tàncí)
o onomatopoeia (=拟声词=nīshēngcí)
y interjection (=语气词=yǔqicí)
h prefix (=前接成分=qiánjiechéngfēn)
k suffix (=后接成分=hòujiechéngfēn)
i idiomatic phrase (=成语=chéngyǔ)
j abbreviate (=简称略语=jiǎnchēnglùeyǔ)
l idiom (=习用语=xíyòngyǔ)
g morpheme (=语素=yǔsù)
Ng noun morpheme (=名语素=míngyǔsù)
Vg verb morpheme (=动语素=dòngyǔsù)
Ag adjective morpheme (=形语素=xingyǔsù)
Dg adverb morpheme (=副语素=fùyǔsù)
Tg temporal morpheme (=时语素=shíyǔsù)
x non-morpheme character (=非语素字=fēiyǔsùzì)
nx non-character string (=非汉字串=fēihànzìchuàn)
w punctuation (=标点符号=biāodiǎnfúhào)

The same sentence as before, now word-segmented and part-of-speech tagged, is next provided with pinyin transliteration and English translation also provided for each character, in the format (Chinese character=pinyin transliteration=English translation), such as in (年=nián=year). This is in order to aid in gaining familiarity, or as might be done to help English-language developers become familiar with Chinese texts being processed, although it is not a necessary part of a natural language processing or chunking process, in this embodiment:

<1> (1 9 9 7 年=1997 nián=year 1997)/t (成=chéng=succeed)/v (了=le={particle indicating completed action})/u (生产=shēngchǎn=produce)/v (停止=tíngzhǐ=stop)/v (滑坡=huápō=collapse)/v (并=bìng=and)/c (出现=chūxiàn=appear)/v (增长=zēngzhǎng=expand)/v (的=de=of)/u (-=yī=one)/m (年=nián=year)/q (。={jùhào}={period})/w After a chunking process, in which the text is divided into syntactically correlated parts of words, the same sentence, now chunked, appears as follows, with brackets around each chunk (first with Chinese characters only; the <2> at the beginning is just a reference marker for the sentence):

<2> [TP 1 9 9 7 年/t] [VP成/v 了/u] [VP生产/v] [VP停止/v] [VP滑坡/v] [CONJP 并/c] [VP 出现/v] [VP 增长/v] 的/u [MP 一/m 年/q] 。/w

The chunk types, along with the chunk assignment indicators, such as "TP", "VP", etc. are described in more detail below. Notice that one portion of the chunked sentence, i.e., "。/w"- is not contained within a pair of brackets indicating a chunk. A punctuation mark, though word-segmented and part-of-speech tagged, is not included in a chunk, according to one of several rules applied in the chunking process, according to the present illustrative embodiment. The same passage is again provided next, with pinyin representation and English translation for each character:

<2> [TP (1 9 9 7 年=1997 nián=year 1997)/t] [VP 成=chéng=succeed)/v (了=le={particle indicating completed action})/u] [VP (生产=shēngchǎn=produce)/v] [VP (停止=tíngzhǐ=stop)/v] [VP 滑坡=huápō=collapse)/v] [CONJP 并=bìng=and)/c] [VP (出现=chūxiàn=appear)/v] [VP (增长=zēngzhǎng=expand)/v] 的=de=of)/u [MP (一=yī=one)/m (年=nián=year)/q] (。={jùhào}={period})/w In the above sentence, there are six verbs (成=chéng=succeed, 生产=shēngchǎn=produces, 停止=tíngzhǐ=stops, 滑坡=huápō=collapse, 出现=chūxiàn=appear, and 增长=zēngzhǎng=expand), a conjunction (并=bìng=and), and two auxiliaries (了=le={particle indicating completed action} and 的=de=of). Hundreds of possible parses can be generated by a full parser due to structural ambiguities among these types of words. A chunking process can avoid syntactic ambiguities to provide consistency for natural language processing (NLP) tasks.

Many chunks have a modifier-head structure. However, verb-object and subject-object relations do not appear inside a chunk. In some applications, the task of chunking can be implemented by a finite state transducer (FST). For natural language processing applications such as information retrieval, information extraction and question answering, a full parsing result of a given sentence or portion of text is not required. Instead a chunking process can meet the need of most applications and also provide a solid basis for further incremental higher level syntactic and semantic analyzing of text.

When the chunking specification is being refined against the training corpus, a semi-automatic inconsistency control method may be used to evaluate and list all potential inconsistent annotations, in one illustrative embodiment. A tool is used to check mechanical errors and detect those potential inconsistent annotations with part-of-speech, and/or lexicalized sequence. (The part-of-speech tags are as listed above.) For example, one inputs a part-of-speech sequence: 'n_n_n', referring to a 'noun_noun_noun' sequence (e.g. "computer network provider"), and an expected chunking annotation result: 'B-NP_I-NP_E-NP', referring to a 'beginning of noun phrase, intermediate part of noun phrase, end of noun phrase', and the tool will list all the consistent and inconsistent sentences in the chunk-annotated text respectively.

Chunk Types

The chunk types defined in the present embodiment of the chunking utility specification include: NP (noun chunk), VP (verb chunk), ADJP (adjective chunk), ADVP (adverb chunk), PP (prepositional chunk), CONJP (conjunction), MP (numerical chunk), TP (temporal chunk), SP (spatial chunk), INTJP (interjection) and INDP (independent chunk).

Many examples of chunked sentences or portions of text according to one illustrative embodiment of a chunking utility, directed to chunking in the Chinese language as one particular example, are provided below, including both retained or correct chunk assignments, and rejected or incorrect chunk assignments. The following example provides additional details of one particular embodiment, to provide a better understanding of how this particular embodiment functions, and to provide a jumping-off point for understanding how a variety of other embodiments would also work by differentiation with the details of the present illustrative embodiment. A considerable breadth of variation from the particular details described below for the present illustrative embodiment may occur in other embodiments. The correctly chunked sentences according to the present illustrative embodiment of a chunking utility are indicated by being prefaced with a reference number, in the format <x>. The rejected passages are indicated by <Not recommended> or by <Incorrect>. While the "not recommended" sentences may be grammatically correct in some context, they have not been able to be generalized, and are determined likely to foster ambiguity, in the present embodiment. Because different combinatations and definitions of chunk assignments may be used in various embodiments, some sentences indicated as "not recommended" in the following, which is only one illustrative example, may be quite appropriate in another embodiment.

Noun Chunk (NP)

A noun chunk is a word sequence which consists of a single noun or a modifier-head structure (=定中结构=dìngzhōngjiégòu). Compounds formed by two or more adjacent nouns are particularly common in Chinese, for example. Typically—about 77% of the time—a Chinese noun phrase takes the form of a modifier-head structure, where the right-most noun in the phrase is the head, and the one or more nouns preceding on the left are modifiers of the head noun. For example, to illustrate the same structure in English (in which it is not as common as in Chinese), "galaxy cluster image" and "dairy farm country" are examples of three-noun phrases in which the right-most noun—"image" and "country" respectively—are the head, and the nouns preceding on the left— "galaxy cluster", "dairy farm"—modify the meaning of the head by providing details to characterize the head. "Galaxy cluster" and "dairy farm" taken by themselves are also noun phrases, in which the noun on the right is once again the head, and the noun preceding on the left modifies the head. The modifier-head structure consists of a head noun and one pre-modifier, whether the pre-modifier has one or more nouns in it. In turn, a pre-modifier consists of a sequence having one or more of the following phrase structures, and excluding an auxiliary 的(=de=of): numerical phrase, adjective phrase, or noun phrase. In other words, the auxiliary 的(=de=of) remains outside of any chunk according to the chunking utility. Other types of noun phrases in Chinese have different structures, for example such as coordination, in which two nouns appear next to each other with an "and" implied between them.

An example of a chunked sentence with noun phrases is provided as follows:

<3> [NP 你/r] [VP 不愧/d 是/v] [NP 华夏/n 文明/n] 的/u [NP 伟大/a 象征/vn]

Head of NP

The part-of-speech of the head words of NP are usually 'n', 'vn', 'r', 'an' 'Ng', names entities ('nr', 'nr', 'nt', 'nz') and some nominal idioms. The part-of-speech 'vn' and 'an' should be treated as a noun only. For example:

<4> [NP 我/r] [VP 见到/v 了/u] [NP 朱/nr/nr 德/nr 总司令/n] o/w

<5> [NP-一些/m 不正之风/i]

<6> [VP 要/v 加强/v] [NP 沟通/vn] 与/c [NP 协作/vn],/w

<Incorrect>: [VP 要/v 加强/v] [VP 沟通/vn] 与/c [VP 协作/vn],/w

Most NPs only have one head, but for some noun coordination without conjunction, it could be annotated as a single NP. The reason is that it is almost impossible to distinguish it from a modifier-head construction. So there are more than one head in a NP when its inner structure is a noun coordination without conjunction, for example:

<7> [PP 向/p] [NP 爸爸/n 妈妈/n] [VP 汇报/v]

<Not recommended>: [PP 向/p] [NP 爸爸/n] [NP 妈妈/n] [VP 汇报/v]

<8> [NP 石家庄/ns] [VP 整顿/v] [NP 警车/n 警灯/n 警报器/n]

<Not recommended>: [NP 石家庄/ns] [VP 整顿/v] [NP 警车/n] [NP 警灯/n] [NP 警报器/n]

<9> [VP 却/d 总是/d 从容/a 地/u 迎接/v] [NP 风雨/n 电闪/n] 的/u [NP 到来/vn]

<Not recommended>: [VP 却/d 总是/d 从容/a 地/u 迎接/v] [NP 风雨/n] [NP 电闪/n] 的/u [NP 到来/vn]

Modifier of NP

Most NPs only have one modifier and it can be a numerical phrase, adjective phrase, or one noun. For example:

<10> [NP 2 1 8/m 个/q 村支书/n]

<Incorrect>: [MP 2 1 8/m 个/q] [NP 村支书/n]

<11> [NP 1万/m 来/m 斤/q] [NP 粮食/n],/w

<Incorrect>: [MP 1万/m 来/m 斤/q] [NP 粮食/n],/w

<12> [VP 取得/v] [NP 更/d 好/a 成绩/n] o/w

<Incorrect>: [VP 取得/v] [ADJP 更/d 好/a ][NP 成绩/n] o/w

<13> [MP 两千/m 多/m 个/q] [NP 乡/n] ヽ/w [NP 镇/n]

<Incorrect>: [MP 两千/m 多/m 个/q 乡/n] ヽ/w [NP 镇/n]

<14> [MP 三/m 本/q] [NP 新/a 书/n]

<Incorrect>: [NP 三/m 本/q 新/a 书/n]

<15> [VP 慰问/v 了/u] [MP 1 0 0/m 多/m 名/q] [NP 大/a 军区/n] [NP 老/a 领导/n]

<Incorrect>: [NP 1 0 0/m 多/m 名/q 大/a 军区/n 老/a 领导/n]

But there are some exceptions for the indistinguishable inner structures. If certain syntactic ambiguities exist inside a chunk and do not affect the boundary of the chunk, then those ambiguities will be left without chunk annotating.

(1) Pattern 'a_n_n'

If the second noun is the head of the NP: a_n_n, no matter whether the a_n or the n_n form a noun phrase first, then a_n_n should be chunk annotated as a single NP. For example:

<16> [NP 现代/a 企业/n 制度/n]

<17> [TP 今年/t] [NP 全/a 路/n 客票/n] [NP 发售/vn] 和/c [NP 预订/vn] [NP 系统/n]

<Not recommended>: [TP 今年/t] [NP 全/a 路/n] [NP 客票/n] [NP 发售/vn] 和/c [NP 预订/vn] [NP 系统/n]

<Incorrect>: [TP 今年/t] [NP 全/a 路/n 客票/n 发售/vn] 和/c [NP 预订/vn 系统/n]

<18> [VP 建立/v] 的/u [NP 全面/a 伙伴/n 关系/n ] [NP 框架/n] [SP 内/f] [VP 发展/v]

<Incorrect>: [VP 建立/v] 的/u [NP 全面/a 伙伴/n 关系/n 框架/n] [SP 内/f] [VP 发展/v]

<19> [PP 对/p] [VP 驻/v] [NP 艰苦/a 地区/n] [NP 部队/n 官兵/n] [NP 生活/vn] [VP 历来/d 十分/m 重视/v]

<Incorrect>: [PP 对/p] [VP 驻/v] [NP 艰苦/a 地区/n 部队/n 官兵/n 生活/vn] [VP 历来/d 十分/d 重视/v]

<20> [MP 1 0 0 0/m 克/q] [NP 小/a 包装/n] [NP 水磨/n 汤圆粉/n]

<Incorrect>: [MP 1 0 0 0/m 克/q] [NP 小/a 包装/n 水磨/n 汤圆粉/n]

[MP 1 0 0 0/m 克/q] [ADJP 小/a 包装/n 水磨/n 汤圆粉/n]

[MP 1 0 0 0/m 克/q] [NP 小/a 包装/n 水磨/n 汤圆粉/n]

If a 'a_n_n' sequence as a NP follows either a numeral m or a MP, then they should be chunk annotated as two chunks separately. For example:

<21> [MP 一些/m] [NP 重要/a 研究/vn 成果/n]

<Incorrect>: [NP 一些/m 重要/a 研究/vn 成果/n]

<22> [MP 5/m家/q] [NP 大型/b 国有/vn 企业/n]

<Incorrect>: [NP 5/m家/q 大型/b 国有/vn 企业/n]

(2) Pattern 'm_n_n' and 'm_q_n_n'

If the second noun is the head of the NP: m_n_n, no matter whether the m_n or the n_n form a noun phrase first, then m_n_n should be chunk annotated as a single NP. For example:

<23> [VP 作为/v] [VP 只/d 谋求/v] [NP 少数/m 大国/n 利益/n] 的/u [NP 手段/n]

<Not recommended>: [VP 作为/v] [VP 只/d 谋求/v] [NP 少数/m 大国/n] [NP 利益/n] 的/u [NP 手段/n]

<Incorrect>: [VP 作为/v] [VP 只/d 谋求/v] [NP 少数/m] [NP 大国/n 利益/n] 的/u [NP 手段/n]

<24> [NP 许多/m 时装/n 设计师/n] [TP 今年/t] 的/u [NP 参展/vn 作品/n]

<Not recommended>: [MP 许多/m] [NP时装/n 设计师/n] [TP 今年/t] 的/u [NP 参展/vn 作品/n]

<Incorrect>: [NP 许多/m 时装/n] [NP 设计师/n] [TP 今年/t] 的/u [NP 参展/vn 作品/n]

25> [MP 6 0万/m 德国/n 人/n]

<Not recommended>:: [NP 6 0万/m] [NP 德国/n 人/n]

<Incorrect>: [NP 6 0万/m 德国/n] [NP 人/n]

<26> [PP 对/p] [NP 全部/m 干部/n] [NP 思想/n 道德/n 建设/vn 情况/n]

<Not recommended>: [PP 对/p] [NP 全部/m 干部/n 思想/n 道德/n 建设/vn 情况/n]

<Incorrect>: [PP 对/p] [MP 全部/m] [NP 干部/n 思想/n 道德/n 建设/vn 情况/n]

Non-Interrupted Noun Sequence

Compounds formed by more than two neighboring nouns are very common in Chinese and usually, but not always, all the nouns to the left of the head of the compound modify the head of the compound. Some compounds consist of several shorter sub-compounds. Unfortunately, sometimes it is impossible to distinguish the inner structures. In one embodiment, the noun sequence may be grouped as a single NP if its head is the last noun of the sequence. This grouping into a single larger NP is less likely to result in a noun phrase being inaccurately severed among two different chunks; the longer chunks also tend to make subsequent parsing easier. For example:

<27> [NP 世界/n 和平/n 事业/n]

<28> [NP 青年/n 志愿者/n 科技/n 服务队/n]

<29> "/w [NP 天津/ns 农民/n 报/n 读者/n 希望/n 小学/n 捐赠/vn 仪式/n] "/w [PP 在/p 丽日/n 下/f] [VP 举行/v] o/w

If two neighboring nouns belong to two different constituents respectively, then they should be chunk annotated as two separated chunks.

(1) Pattern 'v_n_n'

If a v_n pattern forms a VP which in turn modifies the second noun, then these two nouns should be chunk annotated as two chunks separately. For example:

<30> [VP 进/v] [NP 厂/n] [NP 工人/n] [VP 必须/d 具有/v] [NP 高中/n 毕业/vn 文化/n 程度/n] o/w

<Incorrect>: [VP 进/v] [NP 厂/n 工人/n] [VP 必须/d 具有/v]

<31> [NP 十五大/j 精神/n],/w [VP 使/v] [NP 京剧/n] [NP 步履/n] [VP 坚实/a 地/u 迈向/v]

<Incorrect>: [VP 使/v] [NP 京剧/n 步履/n] [VP 坚实/a 地/u 迈向/v]

(2) Pattern '的_n_n'

If the first noun and the preceding 的-phrase (的=de=of {possessive particle}) together form a noun phrase which in turn modifies the second noun, then these two nouns should be chunk annotated as two separated NPs. For example:

<32> [TP 当年/t] [NP "/w 知青/n "/w 人生/n 经历/n] 的/u [NP 节目/n] [NP 收听率/n] [ADJP 很/d 高/a]

<Incorrect>: [TP 当年/t] [NP "/w 知青/n "/w 人生/n 经历/n] 的/u [NP 节目/n 收听率/n] [ADJP 很/d 高/a]

<33> [NP 记者/n] [VP 住/v] 的/u [NP 公寓/n] [NP 楼道/n] [SP 里/f] [VP 写/v 着/u]

<Incorrect>: [NP 记者/n] [VP 住/v] 的/u [NP 公寓/n 楼道/n] [SP 里/f]

(3) Pattern 'n_n_的'

If only the second noun and 的(=de=of {possessive particle}) including its following words form a noun phrase, then these two nouns should be chunk annotated as two separated NPs. For example:

<34> [VP 是/v] [NP 国人/n] [NP 传统/n] 的/u [NP 习俗/n]

<Incorrect>: [VP 是/v] [NP 国人/n 传统/n] 的/u [NP 习俗/n]

(4) Pattern '`/和_n_n'

If the first noun and the conjunction (`or 和=hé=and) including its preceding words form a coordinate phrase which in turn modifies the second noun, then these two nouns should be chunk annotated as two separated NPs. For example:

<35> [NP 党/n] 和/c [NP 国家/n] [NP 领导人/n] [pp 同/p] [NP 首都/n 各界/r]

<Incorrect>: [NP 党/n] 和/c [NP 国家/n 领导人/n] [PP 同/p] [NP 首都/n 各界/r]

(5) Pattern 'n_n_`||和'

If the second noun and the conjunction (` or 和=hé=and) including its following words form a coordinate phrase, then these two nouns should be chunk annotated as two separated NPs. For example:

<36> [NP 两岸/n] [NP 经济/n] `/w [NP 文化/n] [NP 关系/n]

<Incorrect>: [NP 两岸/n 经济/n] `/w [NP 文化/n] [NP 关系/n]

(6) Apposition (同位语=tóngwèi) should be chunk annotated as a separated noun chunk. For example:

<37> [TP 当年/t],/w [NP 伊利/nz] 的/u [NP 前身/n] [NP 回民/n 奶/n 食品厂/n]

<Incorrect>: [TP 当年/t],/w [NP 伊利/nz] 的/u [NP 前身/n 回民/n 奶/n 食品厂/n]

(7) Punctuation between neighboring nouns is omitted in titles of news articles or poems, in the present Chinese embodiment. But those neighboring nouns should be chunk annotated separately according to their context. For example:

<38> [NP 日本/ns 银行/n] [VP 串通/v] [NP 政府/n 官员/n] [NP 大藏/n 大臣/n] [VP 引咎辞职/l]

<Incorrect>: [NP 日本/ns 银行/n] [VP 串通/v] [NP 政府/n 官员/n 大藏/n 大臣/n] [VP 引咎辞职/l]

<39> [NP 小鸟/n] 的/u [NP 家园/n] [NP 小鸟/n] 的/u [NP 天堂/n]

<Incorrect>: [NP 小鸟/n] 的/u [NP 家园/n 小鸟/n] 的/u [NP 天堂/n]

<40> [SP 墙/n 里/f] [VP 开/v] [NP 花/n] [NP 墙/n] [SP 外/f] [ADJP 香/a]

<Incorrect>: [SP 墙/n 里/f] [VP 开/v] [NP 花/n 墙/n] [SP 外/f] [ADJP 香/a]

Named Entities

The adjoining organization-name, the professional title and the person-name should be chunk annotated as three chunks separately. But the person-name followed with his/her title should be chunk annotated as a single NP. For example:

<41> [NP 海南省/ns 群众/n 艺术馆/n] [NP 副/b 馆长/n] [NP 陈/nr 亚福/nr]

<Incorrect>: [NP 海南省/ns 群众/n 艺术馆/n 副/b 馆长/n 陈/nr 亚福/nr]

[NP 海南省/ns 群众/n 艺术馆/n 副/b 馆长/n] [NP 陈/nr 亚福/nr]

[NP 海南省/ns 群众/n 艺术馆/n] [NP 副/b 馆长/n 陈/nr 亚福/nr]

<42> [NP 海南省/ns 群众/n 艺术馆/n] 的/u [NP 副/b 馆长/n] [NP 陈/nr 亚福/nr 先生/nn]

<Incorrect>: [NP 海南省/ns 群众/n 艺术馆/n] 的/u [NP 副/b 馆长/n 陈/nr 亚福/nr 先生/nn]

<43> [NP 出租汽车/l 司机/n] [NP 李/nr 为昌/nr]

<Incorrect>: [NP 出租汽车/l 司机/n 李/nr 为昌/nr]

<44> [NP 本报/r] [VP 驻/v] [NP 俄罗斯/ns] [NP 记者/n] [NP 许/nr 许/nr]

<Incorrect>: [NP 本报/r 驻/v 俄罗斯/ns 记者/n] [NP 许/nr 许/r]

[NP 本报/r] [VP 驻/v] [NP 俄罗斯/ns] [NP 记者/n 许/nr 许/nr]

<45> [NP 国务院/n] [NP 副/b 总理/n] [VP 兼/v] [NP 外交部长/n] [NP 钱/nr 其琛/nr]

<Incorrect>: [NP 国务院/n] 副/b 总理/n] [VP 兼/v] [NP 外交部长/n 钱/nr 其琛/nr]

<46> [NP 总书记/n] [NP 黎/nr 可漂/nr] 、/w [NP 国家/n 主席/n] [NP 陈/nr 德良/nr]

<Incorrect>: [NP 总书记/n 黎/nr 可漂/nr] 、/w [NP 国家/n 主席/n 陈/nr 德良/nr]

VP

A verb chunk is a word sequence which consists of a single verb including a verb-particles structure (refer to the morph lexicon) or a modifier-verb structure (状中结构). (Such particles consist of oriented verbs (趋向动词来，去，上，下，进，出，过，回，开，起，上来，上去，下来，下去，进来，进去，出来，出去，过来，过去，回来，回去，起来 and auxiliaries 了，着，过.) A modifier-verb structure is in turn formed by a head verb and a pre-modifier. We define a pre-modifier here as adverbial phrases and/or auxiliary verbs (助动词/能愿动词). (Auxiliary verbs (能愿动词) include 能，能够，会，可，可以；应，该，应该，当，应当；须，必须，要，需要，得(děi)；愿，愿意，想，要，肯，敢；莫，别，不用(甭)；来，去, etc.) Post-modifiers of a verb such as object (宾语) and complement (补语) should not be included in the verb chunk. The following is an example of VP:

<47> [CONJP 如果/c] [VP 迟迟/d 不/d 能/v 建立/v] [NP 外交/n 关系/n] [NP 它/r] [VP 标志/v 着/u] [NP 俄罗斯/ns 经济/n] [VP 终于/d 摆脱/v 了/u] [NP 停滞/vn / 状态/n]，/w

In addition, particles of a verb-particle structure include auxiliaries 了，着，过. In general, the auxiliary 得=děi=must is an indicator of a following complement. Therefore the auxiliary 得=děi=must remains outside the verb chunk in most cases. One exception is the so-called complement of possible mode (可能式). Since expressions in possible mode look like they are well-constructed, they should also be treated as verb-particle structures including the auxiliary 得. For example, [VP 洗/v 得/u 了], [VP 洗/v 不/d 了/u], [VP 说/v 得/u 明白/a], [VP 说/v 不/d 明白/a]. But in most cases the auxiliary 得=děi=must remains outside any chunk.

Auxiliary (了、着、过)

If the head verb followed by an auxiliary (了、着、过) should be also chunk annotated as a single VP and if it has pre-modifiers, they are grouped as a whole as a VP. For example:

<48> [VP 违章/vd 操作/v] [VP 逾/Vg] [MP 十/m 年/q]

<Incorrect>: [VP 违章/vd] [VP 操作/v] [VP 逾/Vg] [MP 十/m 年/q]

<49> [VP 还/d 普遍/ad 存在/v 着/u] [VP 只/d 重视/v]

<Incorrect>: [ADVP 还/d 普遍/ad] [VP 存在/v 着/u] [VP 只/d 重视/v]

<50> [VP 打听/v 了/u] [NP 几/m 个/q 当地人/n]

Auxiliary Verbs (能愿动词)

A head verb with its preceding auxiliary verbs (能愿动词) should be grouped together as a single VP. Following is a whole list of auxiliary verbs in Chinese:

要(=yào=to want, to be going to, must),
想(=xiǎng=to think, to believe, to suppose, to wish, to want, to miss),
愿意(=yuànyì=to wish, to want, ready, willing),
肯(=kěn=to agree, to consent, to be ready, willing),
敢(=gǎn=dare);
应该(=yīnggāi=ought to, should, must),
应当(=yīngdāng=should, ought to),
应(=yīng=ought),
该(=gāi=to deserve, should, ought to),
得(=děi=to have to, must, ought to, need to);
能够(=nénggòu=be capable of, can, is able),
可以(=kěyǐ=can, may, possible, able to),
可(=kě==can, may, able to),
准(=zhǔn=to allow, to grant, to permit),
许(=xǔ=to allow, to permit, to praise),
得(=dé=allow, permit);
配(=pèi=to deserve),
值得(=zhíde=to be worth, to deserve);
可能(=kěnéng=might, possible, probable, possibility, probability),
会(=huì=can, be possible, be able to),
要(=yào=to want, to be going to, must),
能(=néng=can, may, capable, able)

Following are examples of chunking auxiliary verbs as part of VP chunks:

<51> [MP 二/m] [VP 是/v] [VP 要/v 看/v] [NP 后果/n]

<Incorrect>: [MP 二/m] [VP 是/v] [VP 要/v] [VP看/v] [NP 后果/n]

<52> ，/w [VP 应/v 给予/v] [NP 充分/a 肯定/vn]

<Incorrect>: ，/w [VP 应/v] [VP给予/v] [NP 充分/a 肯定/vn]

Adverbials either before or after an auxiliary verb should be combined with the head verb to form a single VP. For example:

<53> [VP 一概/d 都/d 应/v 提倡/v] 。/w

<Incorrect>: [ADVP 一概/d 都/d] [VP 应/v 提倡/v] 。/w

Oriented Verbs (趋向动词)

A head verb followed by oriented verbs (趋向动词) should be treated as a single VP in whole. Following is a whole list of oriented verbs in Chinese:

来(=lái=to come),
去(=qù=to go, to leave, to remove),
上(=shàng=to go into, to go up),
上来(=shànglái=to come up, to approach),
上去(=shàngqù=to go upwards),
下(=xià=to decline, to go down),
下来(=xiālái={verb suffix indicating continuing})
下去(=xiāqu=to go on, to continue, to go down, to descend),
进(=jì=to advance, to enter, to come in),
进来(=jìlái=to come in),
进去(=jìqù=to go in), 出(=chū=to go out, to come out, to go beyond, to rise, to put forth),
出来(=chūalai=to come out, to emerge),
出去(=chūqù=to go out),
回(=húi=to go back, to turn around, to return),
回来(=húilai=to return, to come back),
回去(=húiqu=to return, to go back),
过(=gùo=to cross, to go over),
过来(=gùolai=to come over, to come up),
过去(=gùoqu=to go over, to pass by),
起(=qǐ=to rise, to raise, to get up),
起来(=qǐlai=to begin or continue an action),
开(=kāi=to start),
到(=dào=to go, to arrive)

Following are examples of chunking oriented verbs as part of VP chunks:

<54> [ADJP 困惑/a] 和/c [VP 失意/v] [VP 重新/d 找/v 到/v 了/u] [NP 自己/r] 的/u

<Incorrect>: [ADJP 困惑/a] 和/c [VP 失意/v] [VP 重新/d 找/v] [VP 到/v 了/u] [NP 自己/r] 的/u

<55> [NP 阿依曼/nr] [VP 和/d 愚/v 上/v 了/u]

<Incorrect>: [NP 阿依曼/nr] [VP 和/d 愚/v] [VP 上/v 了/u]

Some sophisticated VP's include more than one auxiliary verbs, oriented verbs, adverbs or auxiliary particles. For example:

<56> [NP 每次/r] [VP 也/d 只能/v 挣/v 到/v] [NP 十几/m 元/q 钱/n]

<57> [VP 总/d 也/d 忘/v 不/d 标志/v ] [PP 在/p] [NP 千岛湖/ns]

<Incorrect>: [ADVP 总/d 也/d] [VP 忘/v 不/d 了/v] [PP 在/p] [NP 千岛湖/ns]

Verbs other than auxiliary verbs and oriented verbs in the above lists could not be grouped with a head verb to form a v_v VP, in this embodiment. For example:

<58> [VP 开始/v] [VP 化缘/v] [VP 积资/v] [VP 修建/v] [NP 楼阁/n 寺庙/n]

<Incorrect>: [VP 开始/v 化缘/v] [VP 积资/v 修建/v] [NP 楼阁/n 寺庙/n]

<59> [VP 开始/v] [VP 投入/v] [NP 中国/ns 电影/n 事业/n]

<Incorrect>: [VP 开始/v 投入/v] [NP 中国/ns 电影/n 事业/n]

<60> [PP 在/p] [NP 三亚市/ns] [VP 参观/v] [VP 游览/v 了/u] [NP 天涯海角/i]

<Incorrect>: [PP 在/p] [NP 三亚市/ns] [VP 参观/v 游览/v 了/u] [NP 天涯海角/i]

Splittable Verbs (离合词)

For a splittable verb, one auxiliary (助词:标志) and/or one classifier (量词) could be inserted into the splittable verb and form a single VP as a whole. For example:

<62> [PP 在/n 邱北/ns 县城/n 里/f] [VP 迷/v 标志/u 路/n],/w

<Incorrect>: [PP 在/n 邱北/ns 县城/n 里/f] [VP 迷/v 标志/u] [NP 路/n],/w

Verb Complement

1. Preposition

A verb and its following preposition (介词) should be chunk annotated as a VP and a PP respectively. For example:

<63> [VP 尽量/d 沉浸/v] [PP 于/p] [NP 春节/t 联欢/vn 晚会/n] [NP 气氛/n]

<Incorrect>: [VP 尽量/d 沉浸/v 于/p] [NP 春节/t 联欢/vn 晚会/n] [NP 气氛/n]

<64> [VP 永远/d 回荡/v] [PP 在/p] [NP 战士/n] 的/u

<Incorrect>: [VP 永远/d 回荡/v 在/p] [NP 战士/n] 的/u

<65> [VP 躺/v] [PP 在/p] 了/u [SP 树/n 底下/f] [VP 歇凉/v]

<Incorrect>: [VP 躺/v 在/v 了/u] [SP 树/n 底下/f] [VP 歇凉/v]

2. Adjective or Adverb

An adjective or adverb that acts as a post-modifier of a head verb should not be grouped with its preceding verb. For example:

<66> [VP 编/v] [ADJP 编/a] [NP 书/n] [VP 印/v] [ADJP 编/a] [NP 书/n]

<Incorrect>: [VP 编/v 编/a] [NP 书/n] [VP 印/v 编/a] [NP 书/n] [VP 编/v] [NP编/a 书/n] [VP 印/v] [NP 编/a 书/n]

<67> [VP 确实/ad 练/v] [ADJP 编/a] [NP 企业/n "/w 内功/n "/w]

Incorrect>: [VP 确实/ad 练/v 编/a] [NP 企业/n "/w 内功/n "/w]

<68> [VP 如数/d 还/v] [ADJP 清/a],/w [VP 还款/v]

<Incorrect>: [VP 如数/d 还/v 清/a],/w [VP 还款/v]

<69> [ADJP 很/d 难/a] [VP 办/v] [ADJP 编/a]。/w

<Incorrect>: [ADJP 很/d 难/a] [VP 办/v 编/a]。/w

<70> [NP 根本/a 利益/n] [VP 是/v] [ADJP 一致/a] 的/u

<Incorrect>: [NP 根本/a 利益/n] [VP 是/v 一致/a] 的/u

ADJP

An adjective chunk is a word sequence which consists of a single adjective or a head adjective with its pre-modifiers such as an adjective/adverb phrase. As mentioned above, if an ADJP was already included in a NP or VP as its pre-modifier like: [NP合法/a 席位/n], then it should not be tagged as an ADJP explicitly. If an ADJP acts as the predicate of a sentence, then it should be tagged separately. For example:

<71> [NP 那/r 张/q 唱片/n] [ADJP 最为/d 权威/a],/w

ADVP

An adverb chunk is a word sequence which consists of a single adverb or a head with its pre-modifiers. As mentioned above, if an ADVP is already included in a VP or ADJP as its pre-modifier, then it should not be tagged as an ADVP explicitly. An ADVP example is as follows:

<72> [ADVP 只有/d] [NP 他/r] [VP 知道/v] [NP 这个/r 道理/n]。/w

Most prepositions form a PP which consists of only the preposition itself. However, certain prepositional phrases form a frame with explicit boundary such as [PP 在/p . . . 中/f]; [PP 在/p . . . 上/f], so they could be chunked as a multiple word PP without ambiguity. The length of such kinds of PP frames can be limited to four words.

A frame-like PP is formed by a p_ . . . _f pattern, in which the p and f are the left and right boundary respectively, and between these two words at most two other words could be inserted, in this embodiment. For example:

<73> [PP 从/p 水管/n 里/f ] [VP 流/v 出来/v ]

<Incorrect>: [PP 从/p] [SP 水管/n 里/f] [VP 流/v 出来/v ]

<74> [PP 在/p 短/a 时间/n 内/f] [VP 完成/v]

<Incorrect>: [PP 在/p] [NP 短/a 时间/n] [SP 内/f] [VP 完成/v]

<75> [PP 在/p] [NP 这些/r 优秀/a 作品/n] [SP 中/f],/w

<Incorrect>: [PP 在/p 这些/r 优秀/a 作品/n 中/f],/w

<76> [PP 在/p] [SP 黎/j 南部/f] [NP 以色列/ns 占领区/n] [SP 内/f]

<Incorrect>: [PP 在/p 黎/j 南部/f] [NP 以色列/ns 占领区/n] [SP 内/f]

<77> [NP 这/r 个/q 问题/n] [ADJP 难/a] [PP 在/p 资金/n 上/f] o/w

<Incorrect>: [NP 这/r 个/q 问题/n] [ADJP 难/a 在/p] [NP 资金/n] [SP 上/f]o/w

<78> [VP 走/v] [PP 在/p 大道/n 上/f]

<Incorrect>: [VP 走/v 在/p] [SP 大道/n 上/f]

<79>[VP 停靠/v] [PP 在/p] [SP 饭店/n 对面/f] 的/u [NP 马路/n] [SP 边上/f] o/w

<Incorrect>: [VP 停靠/v] [PP 在/p 饭店/n 对面/f] 的/u [SP 马路/n 边上/f]

<80> [PP 在/p] [SP 南河村/ns 村东/f] 的/u [NP 土岸/n] [SP 上/f],/w

<Incorrect>: [PP 在/p] [NP 南河村/ns] [SP 村东/f] 的/u [SP 土岸/n 上/f],/w

<81> [PP 在/p] [SP 城里/f] '/w [SP 城外/f]

<Incorrect>: [PP 在/p 城里/f] '/w [SP 城外/f]

Inside a frame-like PP a multi-word TP or MP may be treated as a single word. For example:

<82> [PP 自/p 1 9 8 3 年/t 以来/f]

<Incorrect>: [PP 自/p] [TP 1 9 8 3 年/t] [SP 以来/f]

<83> [PP 自/p 1 9 8 3 年/t 7月/t 18日/t 以来/f]

<Incorrect>: [PP 自/p] [TP 1 9 8 3 年/t 7月/t 18日/t] [SP 以来/f]

CONJP

Most conjunctions, excluding 和=hé=and, 或=hùo=or, and 与=yǔ=and, form a CONJP which consists of only the single conjunction word alone. Conjunctions 和=hé=and, 或=hùo=or, and 与=yǔ=and remain out of any chunk. For example:

<84> [NP 党/n] 和/c [NP 国家/n] [NP 领导人/n] [PP 同/p] [NP 首都/n 各界/r]

(Conjunction 和/c remains out of any chunk.)

<85> [CONJP 虽然/c] [L 南非/ns] [PP 同/p] [L 中国/ns]
[VP 正式/ad 建交/v]的/u [NP 日期/n] [VP 是/v] [TP 1 9 9 8 年/t 1月/t 1日/t],/w [CONJP 但/c] [PP 在/p 此/r 之前/f],/w [MP 两/m 国/n] [NP 经贸/j 往来/vn] [ADVP 已经/d] [ADJP 相当/d 频繁/a] o/w

MP

A numerical phrase which cannot be included in a NP directly should be tagged as a MP. For example:

<86> [VP 展出/v] [NP 各种/r 冰雕/n 作品/n] [MP 千/m 余/m 件/q] o/w

<87> [NP 这/r 本/q 书/n] [NP 我/n] [VP 读/v 了/u] [MP 三/m 遍/q] o/w

<88> [CONJP 并/c] [VP 出现/v] [VP 增长/v] 的/u [MP 一/m 年/q] o/w

TP

A temporal chunk consists of a temporal word (时间词= shijiānci="temporal word", part-of-speech tag is "t") as its head. A TP always acts as a temporal adverbial constitute in a sentence. For example:

<89> [TP 目前/t],/w [VP 担负/v] [NP 施工/vn 任务/n] 的/u

<90> [VP 正式/ad 建交/v] 的/u [NP 日期/n] [VP 是/v] [TP 1 9 9 8 年/t 1月/t 1日/t],/w

SP

A spatial chunk consists of a localizer (方位词= fāngwèici="direction position word", part-of-speech tag is "f") as its head. Note that, in general, due to structural ambiguity "f" could not chunked with its preceding "n" or "v" directly. For example:

<91> [PP 在/p] [NP 抗日战争/nz] 的/u [VP 连天/v] [NP 烽火/n] [SP 中/f],/w

<92> [PP 在/p] [VP 过去/v] 的/u [NP 一/m 年/q 多/m 时间/n] [SP 里/f],/w those sentences, annotations like: [SP 烽火/n 中/f] and [SP 时间/n 里/f] are incorrect.

A localizer 'f' could be grouped with its preceding preposition p to form a frame-like PP, as referred to above.

If the left context of a localizer is the beginning of a sentence, or a punctuation, except " ", and the number of words in front of the localizer is no more than three, then those words and the localizer should be grouped together as a SP. Inside a SP a multi-word TP or MP is treated as a single word. For example:

<93> [SP 去年/t 冬天/t 以来/f] [NP 美国/ns] 和/c

<Incorrect>: [NP 去年/t 冬天/t] [SP 以来/f] [NP 美国/ns] 和/c

<94> ,/w [SP 1 9 9 6 年/t 6月/t 6日/t 以来/f] [PP 在/p] [SP 市区/s]

<Incorrect>: [TP 1 9 9 6 年/t 6月/t 6日/t] [SP 以来/f]
[PP 在/p] [SP 市区/s]

<95> [TP 去年/t] [VP 入冬/v] [SP 以来/f] [NP 美国/ns] 和/c

<Incorrect>: [sP 去年/t 入冬/v 以来/f] [NP 美国/ns] 和/c

INTJP

An interjection chunk consists of an interjection (语气词= yǔqicí="mood word", part-of-speech tag is "y"). Frequently used interjections include:

吗=ma={question particle},
呢=ne={question particle},
啊=ā="ah" {interjection to indicate realization} OR à={interjection to indicate doubt or skepticism} OR ǎ { interjection to indicate surprise} OR à="oh" {interjection to indicate realization} OR a={modal indicating affirmation, approval, or assent},
呀=ya={ final particle},
吧=ba={intermodal indicating polite suggestion},
了=le={modal particle indicating emphasis on preceding clause}, 罢了=bale={modal particle indicating "that's all", "only", "nothing much"} OR bāliǎo={modal particle indicating "okay"},
的=de={possessive particle},
嘛={modal particle},
etc. For example:

<96> [ADJP 好/d 险/a] [INTJP 啊/y]!/w

<97> [VP 何乐而不为/I] [INTJP 呢/y]?/w

INDP (Independent Chunk)

All the meta-data of a document and all the descriptions inside a pair of brackets, including the opening and closing brackets, should be tagged as an INDP. For example:

<98> [INDP ( 新华社 北京 1月 19日 电)] . . .

<99> [INDP 据/p 新华社/nt 北京/ns 1月/t 8日/t 电/n] [NP 中国/ns] . . .

<100> [INDP (本报/n 记者/n 李/nr 舸/nr 摄/v)]

<101> [INDP (/w 附/v 图片/n 1/m 张/q) /w]

<102> [NP 迪尔德丽·恩赖特/nr] [INDP (/w右/f 一/m)/w]

<103> [INDP (/w 名单/n见/v 1 2/m 版/n)/w]

<104> [INDP (简称/v "/w 菜篮子/n 工程/n "/w)/w]

<105> [NP 石油/n 输出国/n 组织/n] [INDP (/w 欧佩克/nt)/w]

<106> [NP 张/nr 琢/nr] [INDP ( /w 社科院/j 研究生院/n 教授/n)/w] . . .

<107> [NP 小到中雨/l] [INDP (/w 雪/n)/w],/w

<108> [NP 乡/n] [INDP (/w 镇/n)/w] [NP 电管站/n]

<109> [MP 一揽子/l] [NP 援助/vn 贷款/n] [INDP(/w 其中/r 中国/ns 提供/v 了/u 1 0亿/m 美元/q )/w],/w [VP 防止/v] [NP 金融业/n] [VP 全面/ad 崩溃/v],/w

<110> . . . [NP 国产/b 药品/n] [INDP(/w 共/d 3/m 类/q 1 5/m 种/q 化学药品/n 和/c 6/m 类/q 3 2/m 种/q 生物制品/l )/w] 的/u [NP 出厂/vn] . . .

<111> . . . [INDP(/w 约/d 占/v 银行/n 贷款/vn 总额/n 的/u 3 0%/m )/w],/w . . .

<112> [INDP(/w 一/m)/w] . . .

Certain inserted phrases (插入语) which do not act as syntactic constituents (句法成分) in a sentence should be tagged as a INDP. Following are examples of those inserted phrases: 众所周知、无独有偶、其实不然、不管三七二十一、无庸讳言、谢天谢地、可想而知、迄今为止、毫无疑问、想想也是、总而言之、换句话说、综上所述、也就是说、这样一来、一句话、接下来、俗话说、说到底、这样一来、. . .

For example:

<113> 。/w [INDP 毫无疑问/l],/w [VP 实施/v] [NP 股份制/n],/w [PP 对于/p] [VP 深化/v]

<114> ,/w [INDP 这样一来/l],/w [VP 不/d 用/v] [NP 环卫/j 工人/n] [VP 来/v]

<115> ,/w [INDP 也就是说/l] [VP 要/v] [PP 把/p] [NP 右侧/f 路口/n] 的/u [NP 车/n]

Although Chinese was used for these illustrative examples, methods according to various embodiments are advantageously applicable to any of a wide variety of writing systems.

Similarly, although the subject matter has been described in language specific to structural features and/or methodological acts, it is to be understood that the subject matter defined in the appended claims is not limited to the specific features or acts described above. Rather, the specific features and acts described above are disclosed as illustrative examples of ways to implement the claimed subject matter. A wide variety of implementations of the claimed subject matter is contemplated, including but not limited to implementation in stand-alone applications, portions of applications, network-based applications, server-hosted applications, wireless-delivered applications, dynamic-link libraries, objects, and a wide variety of other code, data, resources, and combinations thereof.

What is claimed is:

1. A method, implemented by a computing device, comprising:
   providing a draft chunking specification;
   chunking one or more corpora, with a processor, in accordance with the draft chunking specification;
   flagging chunk inconsistencies in the chunking of similar portions of the one or more corpora, in which two or more identical or similar sections of text from different parts of the one or more corpora have been chunked differently from each other;
   providing a chunking utility comprising chunking assignments revised from the draft chunking specification such that at least some of the flagged chunk inconsistencies are resolved, such that for at least some of the chunk inconsistencies, the two or more identical or similar sections of text that had been chunked differently from each other are instead assigned a consistent chunking indication;
   wherein providing the chunking utility comprises automatically calculating with a processor a consistency ratio for the chunking of the corpora; and
   further comprising comparing the calculated consistency ratio with a chunk consistency threshold, and resolving the chunk inconsistencies at least until the calculated consistency ratio meets the chunk consistency threshold.

2. The method of claim 1, wherein flagging the chunk inconsistencies comprises an automated comparison of the chunking applied to similar sets of characters from the one or more corpora.

3. The method of claim 2, wherein flagging the chunk inconsistencies further comprises automatically providing, to an output device, indications of similar sets of characters that have been chunked differently.

4. The method of claim 1, further comprising providing access to the chunking utility to one or more external applications.

5. The method of claim 4, wherein at least one of the external applications performs a function based at least in part on the chunking assignments from the chunking utility.

6. The method of claim 4, wherein the one or more external applications comprises at least one of a natural language processing application, a voice user interface, a machine translation tool, and a search tool.

7. The method of claim 1, wherein the flagging chunk inconsistencies comprises receiving an input comprising a part-of-speech sequence and a chunk sequence, and automatically flagging one or more part-of-speech sequences in the corpora that match the part-of-speech sequence in the input, and that have a different chunk sequence from the chunk sequence in the input.

8. The method of claim 1, wherein the chunking utility is directed to chunking a non-alphabetic writing system, wherein providing the draft chunking specification comprises providing indications for word-segmenting the non-alphabetic writing system.

9. The method of claim 1, wherein providing the draft chunking specification comprises assigning sets of one or more characters to chunk types including at least one of a noun chunk, a verb chunk, an adjective chunk, an adverb chunk, a prepositional chunk, a conjunction chunk, a numerical chunk, a temporal chunk, a spatial chunk, an interjection chunk, and an independent chunk.

10. The method of claim 1, further comprising one or more iterations of:
chunking one or more additional corpora based on the chunking utility;
flagging further inconsistencies in the chunking of similar portions of the one or more additional corpora, in accordance with the chunking utility; and
providing a more refined chunking utility comprising chunking assignments further revised from the chunking utility such that at least some of the further flagged inconsistencies are resolved.

11. A method, implemented by a computing device, comprising:
providing a chunking specification;
providing one or more part-of-speech-tagged corpora;
chunking the one or more corpora, with a processor, in accordance with the chunking specification, the chunking comprising:
chunking nouns, noun-verbs, pronouns, noun-adjectives, noun morphemes, and named entities, either single or as the head in a modifier-head structure with a modifier comprising a noun, a numerical phrase, or an adjective phrase, as noun chunks;
chunking verbs, verb-particle structures in which the particle comprises an oriented verb or an auxiliary, and modifier-verb structures in which the modifier comprises an adverbial phrase or an auxiliary verb, in verb chunks;
refining the chunking specification through iterative chunking consistency feedback with a training corpus, wherein one or more groups of identical or similar sections of text from different parts of the training corpus that have been chunked differently from each other are compared, and for one or more of the groups, the chunking of one of the identical or similar sections of text is selected to replace the chunking of the other identical or similar sections of text within the group;
automatically calculating, with a processor, a consistency ratio for the chunking of the training corpus;
comparing the calculated consistency ratio with a chunk consistency threshold, wherein refining the chunking specification is continued at least until the calculated consistency ratio meets the chunk consistency threshold;
incorporating the refined chunking specification in a chunking utility that also comprises a plurality of definitions of chunk types and a set of chunking rules;
receiving an input;
assigning chunk types to portions of the input based at least in part on the chunking utility comprising the refined chunking specification; and
providing an output comprising the portions of the input with the assigned chunk types.

12. The method of claim 11, further comprising segmenting the input into words and tagging the words with part-of-speech tags, prior to the assigning chunk types to the portions of the input.

13. The method of claim 11, wherein the input is received in a format other than text, and the method further comprises converting the input into a text format, prior to the assigning the chunk types to the portions of the input.

14. The method of claim 13, wherein the input is received in a format of either speech or handwriting, and the converting of the input into text comprises applying an automatic speech recognition tool or an automatic handwriting recognition tool to the input.

15. The method of claim 11, wherein the assigning chunk types to the portions of the input comprises searching the chunking utility for chunked text portions similar to the portions of the input, and assigning the portions of the input chunk types corresponding to chunk types associated with the chunked text portions.

16. The method of claim 11, further in which providing the one or more part-of-speech-tagged corpora comprises tagging each of a plurality of the words in one or more corpora as either: a noun, a person name, a location name, an organization name, an other proper name, a spatial word, a temporal word, a localizer, a verb, an adverb-verb, a noun-verb, an adjective, noun-adjective, an adverb-adjective, an adverb, a state word, a non-predicate adjective, a pronoun, a numeral, a measure word, a conjunction, a preposition, an auxiliary, an exclamation, an onomatopoeia, an interjection, a prefix, a suffix, an idiomatic phrase, an abbreviate, an idiom, a morpheme, a noun morpheme, a verb morpheme, an adjective morpheme, an adverb morpheme, a temporal morpheme, a non-morpheme character, a non-character string, or a punctuation.

17. The method of claim 11, further in which a pattern with an adjective, a first noun, and a second noun, is chunked in a single noun chunk if the pattern forms a modifier-head structure where the adjective and first noun form a modifier and the second noun forms a head of the structure, and if the pattern is preceded by a numeral or a numerical chunk, the pattern is chunked separately from the preceding numeral or numerical chunk.

18. The method of claim 11, further in which a pattern with a numeral, a first noun, and a second noun is chunked in a single noun chunk if the second noun is the head of the pattern and is modified by the numeral and the first noun, and a pattern with more than two neighboring nouns is chunked in a single noun chunk.

19. The method of claim 11, further in which a pattern with a verb or a possessive particle, then a first noun, then a second noun is chunked with the first and second nouns in separate chunks if the verb and first noun form a verb phrase that modifies the second noun or the possessive particle and first noun form a noun phrase that modifies the second noun.

20. The method of claim 11, further in which a pattern with a first noun, then a second noun, then a possessive particle is chunked with the first noun and second noun in separate noun chunks, if the second noun, the possessive particle, and one or more words subsequent to the possessive particle form a noun phrase that excludes the first noun.

* * * * *